US010562438B2

(12) United States Patent
Katsura et al.

(10) Patent No.: US 10,562,438 B2
(45) Date of Patent: Feb. 18, 2020

(54) LIGHT-EMITTING ELEMENT DRIVING SEMICONDUCTOR INTEGRATED CIRCUIT, LIGHT-EMITTING ELEMENT DRIVING DEVICE, LIGHT-EMITTING DEVICE, AND VEHICLE (71) Applicant: Rohm Co., Ltd., Kyoto (JP)

(72) Inventors: Koji Katsura, Kyoto (JP); Yasunori Muramatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/492,102

(22) Filed: Apr. 20, 2017

(65) Prior Publication Data

US 2017/0305326 A1 Oct. 26, 2017

(30) Foreign Application Priority Data

Apr. 22, 2016 (JP) .................................. 2016-086250

(51) Int. Cl.
*H05B 33/08* (2006.01)
*B60Q 1/00* (2006.01)

(52) U.S. Cl.
CPC ............ *B60Q 1/0088* (2013.01); *H05B 33/08* (2013.01)

(58) Field of Classification Search
CPC ............................... B60Q 1/0088; H05B 33/08
See application file for complete search history.

(56) References Cited

U.S. PATENT DOCUMENTS

| 7,583,034 | B2 * | 9/2009 | Lara-Ascorra | ..... H05B 33/0827 315/291 |
| 8,120,201 | B2 * | 2/2012 | Fujino | ............... H02M 3/33507 307/10.8 |
| 8,410,711 | B2 * | 4/2013 | Lin | ..................... H05B 33/0824 315/224 |
| 9,357,597 | B2 * | 5/2016 | Nakamura | ............ F21S 41/663 |
| 9,428,101 | B2 * | 8/2016 | Takagimoto | ......... B60Q 11/005 |

(Continued)

FOREIGN PATENT DOCUMENTS

DE 102008010320 8/2008
DE 112012005774 T5 10/2014
(Continued)

OTHER PUBLICATIONS

European Search Report for EP Patent Application No. 17 16 7556 dated Aug. 2, 2017.
(Continued)

*Primary Examiner* — Alexander H Taningco
*Assistant Examiner* — Kurtis R Bahr
(74) *Attorney, Agent, or Firm* — Fish & Richardson P.C.

(57) ABSTRACT

A light-emitting element driving semiconductor integrated circuit constitutes at least part of a light-emitting element driving device that is configured to drive a first and a second light source when the first light source is not short-circuited and drive the second light source when the first light source is short-circuited and that includes an output capacitor. The light-emitting element driving semiconductor integrated circuit has a controller configured to control the resistance value of a variable resistor connected in series with the first and second light sources according to the voltage across a resistor connected in series with the first and second light sources.

16 Claims, 8 Drawing Sheets (56) References Cited

U.S. PATENT DOCUMENTS

| | | | | |
|---|---|---|---|---|
| 9,781,789 B1* | 10/2017 | Lee | H05B 33/0815 | |
| 9,854,632 B2* | 12/2017 | Mercier | H01L 27/156 | |
| 2008/0203946 A1 | 8/2008 | Ito et al. | | |
| 2009/0153059 A1* | 6/2009 | Kitagawa | H05B 33/0887 | |
| | | | | 315/77 |
| 2012/0181931 A1 | 7/2012 | Katsura | | |
| 2014/0361696 A1* | 12/2014 | Siessegger | H05B 33/0806 | |
| | | | | 315/186 |
| 2015/0069906 A1* | 3/2015 | Niedermeier | H05B 33/0803 | |
| | | | | 315/77 |
| 2015/0208476 A1* | 7/2015 | Muramatsu | H05B 33/0815 | |
| | | | | 315/193 |
| 2016/0096467 A1* | 4/2016 | Murakami | H05B 33/0815 | |
| | | | | 315/82 |

FOREIGN PATENT DOCUMENTS

| | | |
|---|---|---|
| JP | 2008-205357 A | 9/2008 |
| JP | 2012-028184 A | 2/2012 |
| JP | 2013-047047 | 3/2013 |
| JP | 2013-254718 A | 12/2013 |
| WO | 2013/0185261 | 12/2013 |

OTHER PUBLICATIONS

Japanese Patent Office; Office Action mailed in counterpart Japanese Patent Application No. 2016-086250 (dated Dec. 3, 2019), with English Language Translation.

* cited by examiner

LIGHT-EMITTING ELEMENT DRIVING SEMICONDUCTOR INTEGRATED CIRCUIT, LIGHT-EMITTING ELEMENT DRIVING DEVICE, LIGHT-EMITTING DEVICE, AND VEHICLE

This nonprovisional application claims priority under 35 U.S.C. § 119(a) on Patent Application No. 2016-086250 filed in Japan on Apr. 22, 2016, the entire contents of which are hereby incorporated by reference.

BACKGROUND OF THE INVENTION

1. Field of the Invention

The present invention relates to a light-emitting element driving semiconductor integrated circuit. The present invention relates also to a light-emitting element driving device, and to a light-emitting device and a vehicle employing a light-emitting element driving device.

2. Description of Related Art

A headlamp for automobiles is configured to be switchable between a state for radiating a low beam as a passing beam and a state for emitting a high beam, which reaches farther ahead than the low beam, as a driving beam.

One example of a light-emitting device for use as an automobile headlamp is disclosed in JP-A No. 2013-47047. In the light-emitting device (LED lighting circuit) disclosed there, a plurality of light-emitting elements are connected in series. For a driving beam, all those light-emitting elements are lit; for a passing beam, part of the light-emitting elements are short-circuited so that only the rest of them are lit.

In the light-emitting device (LED lighting circuit) disclosed in JP-A No. 2013-47047, when switching from the driving beam to the passing beam takes place, the output voltage of the DC-DC converter that drives the light-emitting elements drops. This drop in the output voltage causes the electrical charge stored in the output capacitor in the DC-DC converter to be discharged from the output capacitor, resulting in a momentary overcurrent in the output current of the DC-DC converter, and hence a momentary overcurrent through those LEDs which are not short-circuited. Thus, when switching from the driving beam to the passing beam takes place, the LEDs that are not short-circuited are damaged.

According to JP-A No. 2013-47047, during switching from the driving beam to the passing beam, the short-circuiting of the LEDs is performed in two stages so that the output voltage of the DC-DC converter drops in two stages with a view to reducing the overcurrent.

Inconveniently, simply reducing the magnitude of the overcurrent, the light-emitting device (LED lighting circuit) disclosed in JP-A No. 2013-47047 does not provide a fundamental solution to the overcurrent: optimal values of the predetermined output voltage Va to be obtained after the first-stage drop in the output voltage and the duration t1 for which to keep the predetermined output voltage Va need to be found experimentally by cut and try to ensure that the overcurrent is reduced to a desired value. Seeing that the optimal values of Va and t1 mentioned above vary with changes in the specifications of the LEDs and with individual variations among the LEDs, it is difficult, with the light-emitting device (LED lighting circuit) disclosed in JP-A No. 2013-47047, to guarantee that the overcurrent is reduced to a desired value.

SUMMARY OF THE INVENTION

An object of the present invention is to provide a light-emitting element driving semiconductor integrated circuit that can suppress a high current through light-emitting elements on the occasion of reducing the number of light-emitting elements lit. Another object of the present invention is to provide a light-emitting element driving device that can suppress a high current through light-emitting elements on the occasion of reducing the number of light-emitting elements lit, and a light-emitting device and a vehicle employing such a light-emitting element driving device.

According to what is disclosed herein, one example of a light-emitting element driving semiconductor integrated circuit constituting at least part of a light-emitting element driving device that is configured to drive a first light source including at least one light-emitting element and a second light source including at least one light-emitting element and connected in series with the first light source when the first light source is not short-circuited and drive the second light source when the first light source is short-circuited and that includes an output capacitor includes a controller that is configured to control the resistance value of a variable resistor connected in series with the first and second light sources according to the voltage across a resistor connected in series with the first and second light source.

According to what is disclosed herein, another example of a light-emitting element driving semiconductor integrated circuit constituting at least part of a light-emitting element driving device that is configured to drive a first light source including at least one light-emitting element and a second light source including at least one light-emitting element and connected in series with the first light source when the first light source is not short-circuited and drive the second light source when the first light source is short-circuited and that includes an output capacitor includes a controller that is configured to control the resistance value of a variable resistor provided in a short-circuiting path by which the first light source is short-circuited according to the voltage across a resistor connected in series with the first and second light source.

According to what is disclosed herein, one example of a light-emitting element driving device configured to drive a first light source including at least one light-emitting element and a second light source including at least one light-emitting element and connected in series with the first light source when the first light source is not short-circuited and drive the second light source when the first light source is short-circuited includes a power supply circuit configured to generate an output voltage from an input voltage and including an output capacitor, a short-circuiting path configured to short-circuit the first light source, a switch provided in the short-circuiting path and configured to switch between a state where the short-circuiting path is in conducting state and a state where the short-circuiting path is in cut-off state, a resistor connected in series with the first and second light sources, a variable resistor connected in series with the first and second light sources, and a controller configured to control the resistance value of the variable resistor according to the voltage across the resistor.

According to what is disclosed herein, another example of a light-emitting element driving device configured to drive a first light source including at least one light-emitting element and a second light source including at least one light-emitting element and connected in series with the first light source when the first light source is not short-circuited and drive the second light source when the first light source is short-circuited includes a power supply circuit configured to generate an output voltage from an input voltage and including an output capacitor, a short-circuiting path configured to short-circuit the first light source, a variable resistor provided in the short-circuiting path, a resistor connected in series with the first and second light sources, and a controller configured to control the resistance value of the variable resistor according to the voltage across the resistor.

According to what is disclosed herein, a light-emitting device includes a first light source including at least one light-emitting element, a second light source including at least one light-emitting element and connected in series with the first light source, and either of the light-emitting element driving devices configured as described above configured to drive the first and second light sources when the first light source is not short-circuited and drive the second light source when the first light source is short-circuited.

According to what is disclosed herein, a vehicle includes the light-emitting device configured as described above, and the light-emitting device is used as a headlamp.

The significance and effect of the present invention will become clear through the description of embodiments given below. It should however be understood that these embodiments are merely examples of how the present invention can be implemented, and the meanings of the terms describing the present invention and its features are not limited to those in which they are used in the following description of the embodiments.

DETAILED DESCRIPTION OF PREFERRED EMBODIMENTS

First Configuration Example

Figure 1:
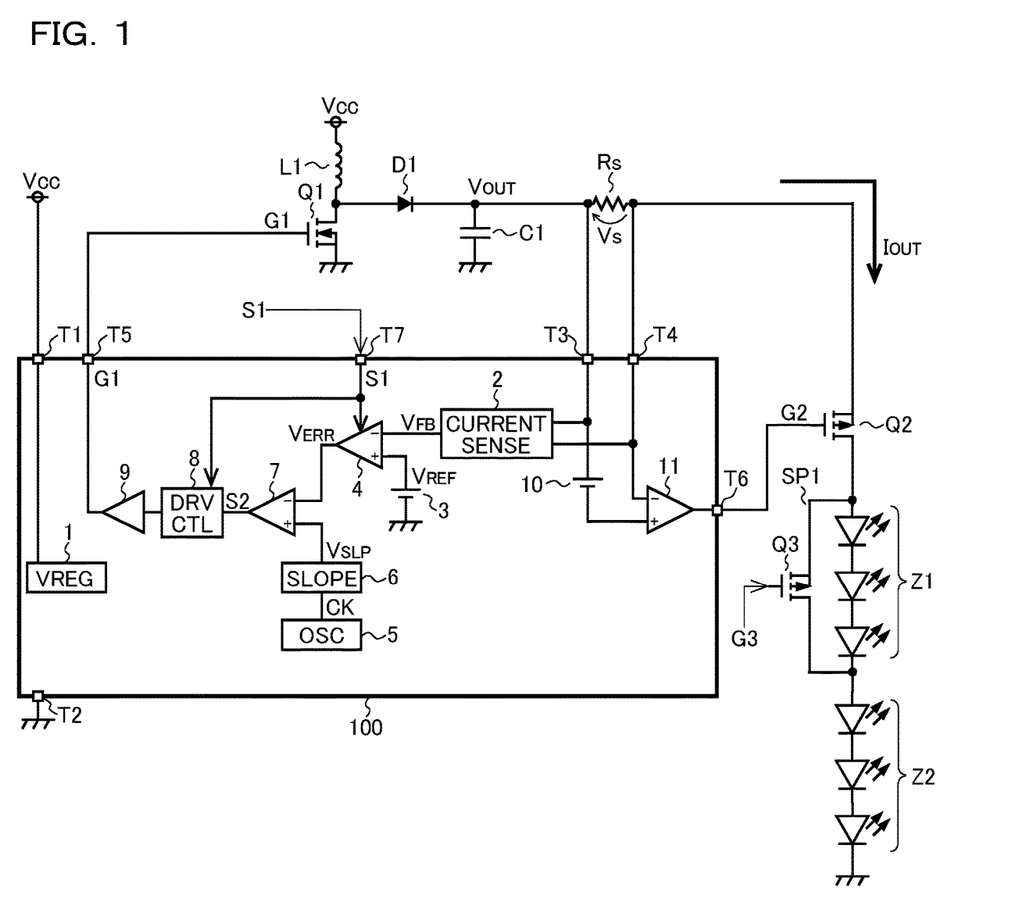
FIG. 1 is a diagram showing a light-emitting device according to a first configuration example.

FIG. 1 is a diagram showing a light-emitting device according to a first configuration example. The light-emitting device shown in FIG. 1 includes a light-emitting element driving device, which includes a light-emitting element driver IC 100, a coil L1, an N-channel MOS field-effect transistor (hereinafter an NMOS transistor) Q1, a diode D1, an output capacitor C1, a sense resistor Rs, a P-channel MOS field-effect transistor (hereinafter a PMOS transistor) Q2, a short-circuiting path SP1, and a PMOS transistor Q3. The light-emitting device shown in FIG. 1 further includes light sources Z1 and Z2 as the target of driving by the light-emitting element driving device. Although in the configuration example shown in FIG. 1, the light source Z1 is composed of three light-emitting diodes, this is not meant to limit the number of light-emitting diodes to three; the number may instead be one, or two or more. The same applies to the light source Z2.

The light-emitting element driver IC 100 is a semiconductor integrated circuit device (a so-called LED driver IC) that has integrated into it a reference voltage generator 1, a current detector 2, constant-voltage sources 3 and 10, error amplifiers 4 and 11, an oscillation circuit 5, a slope voltage generator 6, a comparator 7, a driver controller 8, and a driver 9. The light-emitting element driver IC 100 further has external terminals T1 to T7 for establishing electrical connection with the outside.

The coil L1, the NMOS transistor Q1, the diode D1, the output capacitor C1, the sense resistor Rs, the PMOS transistors Q2 and Q3, the short-circuiting path SP1, and the light sources Z1 and Z2 are externally connected to the light-emitting element driver IC 100.

A supply voltage Vcc is applied to the external terminal T1, and the external terminal T2 is grounded. The supply voltage Vcc is applied to the first terminal of the coil L1, and the second terminal of the coil L1 is connected to the drain of the NMOS transistor Q1 and to the anode of the diode D1. The source of the NMOS transistor Q1 is grounded, and the gate of the NMOS transistor Q1 is connected to the external terminal T5.

The cathode of the diode D1 is connected to the first terminal of the output capacitor C1, to the first terminal of the sense resistor Rs, and to the external terminal T3. The second terminal of the output capacitor C1 is grounded. The second terminal of the sense resistor Rs is connected to the external terminal T4 and to the source of the PMOS transistor Q2. The gate of the PMOS transistor Q2 is connected to the external terminal T6, and the drain of the PMOS transistor Q2 is connected to the anode of the light source Z1 and to the first terminal of the short-circuiting path SP1. In the short-circuiting path SP1, the PMOS transistor Q3 is provided.

The PMOS transistor Q3 is controlled between ON and OFF states according to a gate signal G3. Usable as the gate signal G3 for the PMOS transistor Q3 is, for example, a signal fed from a microcomputer (not shown), a camera module (not shown), or the like. In another possible configuration, a switch is provided that switches between a state where the gate of the PMOS transistor Q3 is connected to a first voltage feeder which outputs a HIGH-level voltage and a state where the gate of the PMOS transistor Q3 is connected to a second voltage feeder which outputs a LOW-level voltage, and the switch is controlled according to a signal fed from a microcomputer (not shown), a camera module (not shown), or the like. Also with this configuration, a HIGH-level or LOW-level gate signal G3 can be fed to the gate of the PMOS transistor Q3.

When the PMOS transistor Q3 is in ON state, the short-circuiting path SP1 is in conducting state and short-circuits the light source Z1. On the other hand, when the PMOS transistor Q3 is in OFF state, the short-circuiting path SP1 is in cut-off state and does not short-circuit the light source Z1. The cathode of the light source Z1 and the second terminal of the short-circuiting path SP1 are connected to the anode of the light source Z2, and the cathode of the light source Z2 is grounded.

Next, the circuit blocks integrated into the light-emitting element driver IC 100 will be described one by one in outline.

The reference voltage generator 1 generates a reference voltage $V_{REG}$ from the supply voltage Vcc which is applied to the external terminal T1. The reference voltage $V_{REG}$ is used as a driving voltage for other circuit blocks.

The current detector 2 monitors the voltage between the external terminals T3 and T4, that is, the voltage Vs across the sense resistor Rs, to generate a feedback voltage $V_{FB}$ which is commensurate with the voltage Vs across the sense resistor Rs. The constant-voltage source 3 generates a reference voltage $V_{REF}$.

The error amplifier 4 generates an error voltage $V_{ERR}$ which is commensurate with the difference between the reference voltage $V_{REF}$, which is applied to the non-inverting input terminal (+) of the error amplifier 4, and the feedback voltage $V_{FB}$, which is applied to the inverting input terminal (−) of the error amplifier 4. The output operation of the error amplifier 4 is enabled and disabled according to a PWM light control signal S1 which is fed in from outside the light-emitting element driver IC 100 via the external terminal T7. Specifically, the output operation of the error amplifier 4 is enabled when the PWM light control signal S1 is at HIGH level, and is disabled when the PWM light control signal S1 is at LOW level.

The oscillation circuit 5 generates a clock signal CK. The slope voltage generator 6 generates a slope voltage $V_{SLP}$ with a triangular or saw-tooth waveform by using the clock signal CK.

The comparator 7 compares the error voltage $V_{ER}$, which is applied to the inverting input terminal (−) of the comparator 7, and the slope voltage $V_{SLP}$, which is applied to the non-inverting input terminal (+) of the comparator 7, to generate a comparison signal S2 which is commensurate with the result of the comparison.

The driver controller 8 drives the driver 9 according to the comparison signal S2, and thereby turns ON and OFF the NMOS transistor Q1. The output operation of the driver controller 8 is enabled and disabled according to the PWM light control signal S1. Specifically, the output operation of the driver controller 8 is enabled when the PWM light control signal S1 is at HIGH level, and is disabled when the PWM light control signal S1 is at LOW level. Accordingly, the light-emitting element driver IC 100 performs lighting control when the PWM light control signal S1 is at HIGH level, and performs extinguishing control when the PWM light control signal S1 is at LOW level.

The driver 9 generates a gate signal G1 for the NMOS transistor Q1 according to an instruction from the driver controller 8, and feeds the gate signal G1 to the external terminal T5.

The constant-voltage source 10 generates a bias voltage $V_B$. From the voltage between the external terminals T3 and T4, that is, the voltage Vs across the sense resistor Rs, the bias voltage $V_B$ is deducted by the constant-voltage source 10, and the resulting voltage is fed to the error amplifier 11. The error amplifier 11 generates an error signal which is commensurate with the input voltage (Vs−$V_B$) to it applied between the non-inverting input terminal (+) and the inverting input terminal (−) of the error amplifier 11, and feeds the error voltage to the external terminal T6. The error signal from the error amplifier 11 that is fed out via the external terminal T6 serves as a gate signal G2 for the PMOS transistor Q2. The bias voltage $V_B$ has a value that is the sum of an average value (for example, 0.2 V) of the voltage Vs across the sense resistor Rs as observed when the PMOS transistor Q3 is held in either ON or OFF state and a predetermined value (for example, 0.01 V). When the voltage Vs across the sense resistor Rs is equal to or lower than the bias voltage $V_B$, the input voltage (Vs−$V_B$) to the error amplifier 11 is equal to or lower than zero, and the PMOS transistor Q2 operates in a saturation characteristics region, the drain-source resistance remaining approximately constant. On the other hand, when the voltage Vs across the sense resistor Rs is higher than the bias voltage $V_B$, the input voltage (Vs−$V_B$) to the error amplifier 11 is higher than zero, and the PMOS transistor Q2 operates in a linear (non-saturation) characteristics region, the drain-source resistance increasing as the level of the error signal from the error amplifier 11 increases.

Here, when the PMOS transistor Q3 turns from OFF state to ON state according to the gate signal G3, the anode voltage of the light source Z1 sharply falls from the sum of the forward voltages of the light sources Z1 and Z2 to the forward voltage of the light source Z2 alone.

Figure 2:
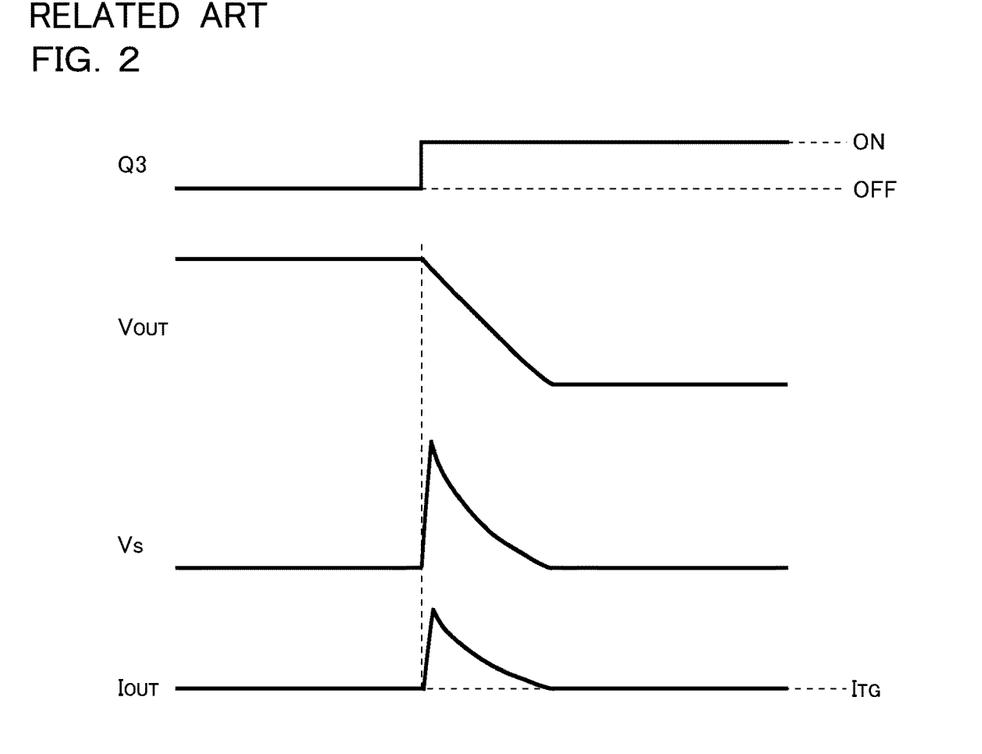
FIG. 2 is a timing chart showing a voltage across a sense resistor and an output current in a comparison example.

Consider a configuration (comparison configuration) that lacks the PMOS transistor Q2. Then the voltage Vs across the sense resistor Rs and the output current $I_{OUT}$ of the light-emitting element driving device (switching power supply device) which drives the light sources behave as follows. Across the sense resistor Rs is present all the potential difference between the voltage at the first terminal of the output capacitor C1, that is, the output voltage $V_{OUT}$ of the light-emitting element driving device (switching power supply device), and the anode voltage of the light source Z1; thus, the output current $I_{OUT}$ becomes high momentarily (see FIG. 2). Thereafter, the electrical charge stored in the output capacitor C1 is discharged, and as the output voltage $V_{OUT}$ decreases, the output current $I_{OUT}$ approaches the target value $I_{TG}$ of constant-current control by the light-emitting element driving device (switching power supply device) which drives the light sources.

Figure 3:
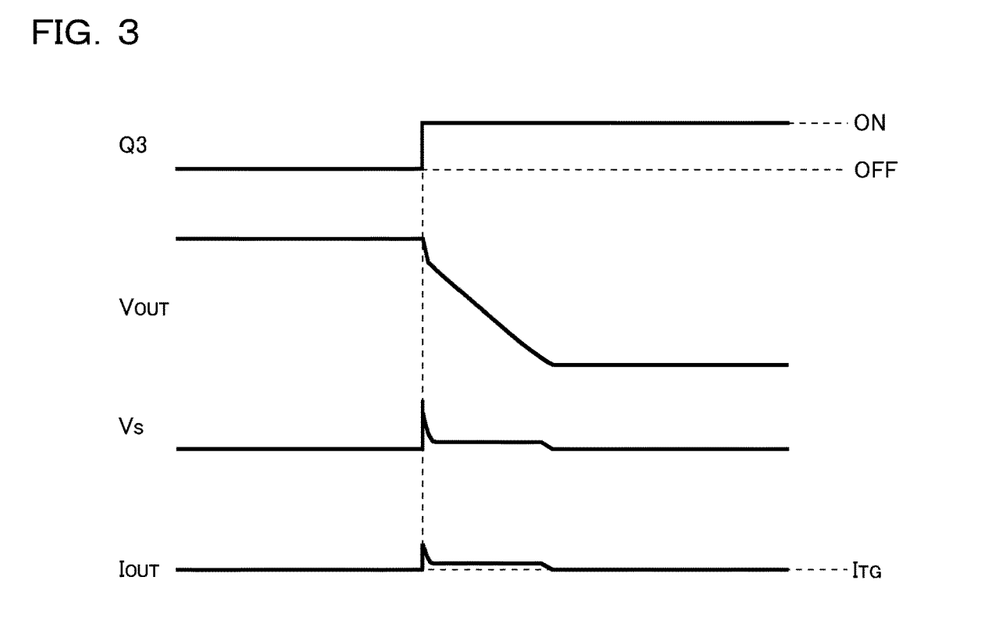
FIG. 3 is a timing chart showing a voltage across a sense resistor and an output current in the light-emitting device shown in FIG. 1.

By contrast, in this configuration example, owing to the provision of the PMOS transistor Q2, the higher the voltage Vs across the sense resistor Rs, the higher the drain-source resistance of the PMOS transistor Q2, and thus the higher the resistance between the first terminal of the output capacitor C1 and the anode of the light source Z1. This makes it possible to suppress an increase in the output current $I_{OUT}$ that accompanies a sharp fall in the anode voltage of the light source Z1 from the sum of the forward voltages of the light sources Z1 and Z2 to the forward voltage of the light source Z2 alone.

Second Configuration Example

Figure 4:
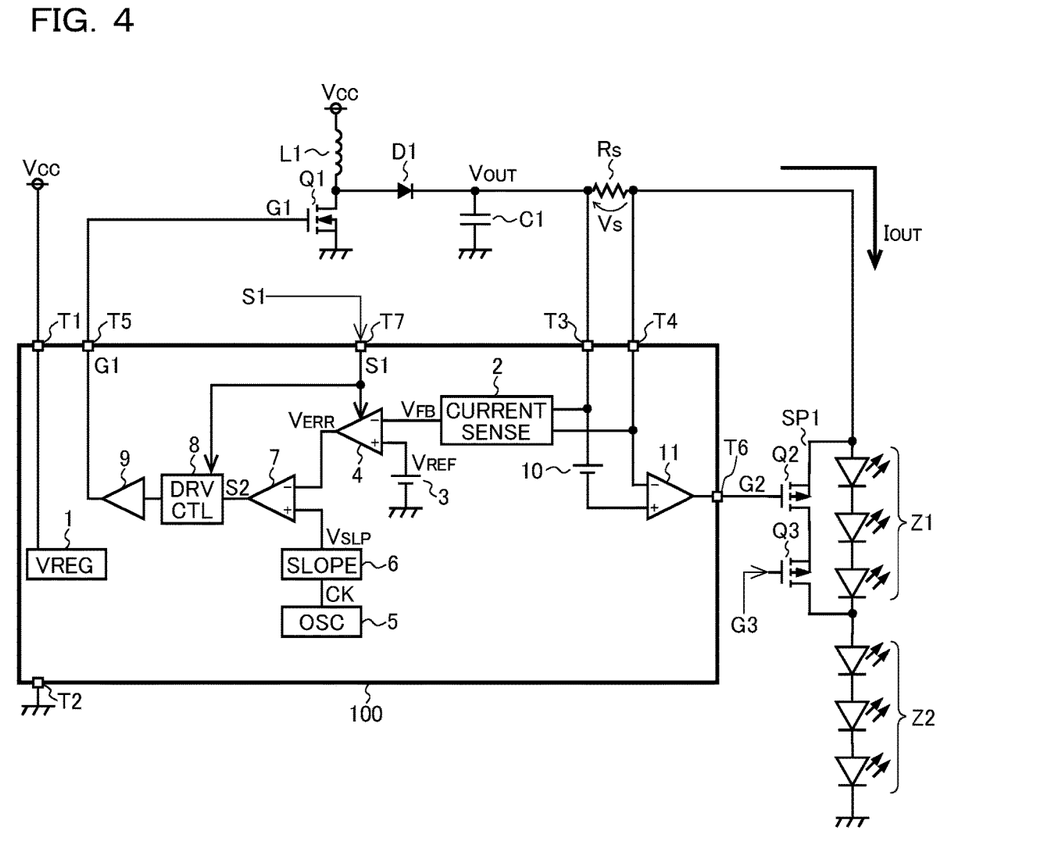
FIG. 4 is a diagram showing a light-emitting device according to a second configuration example.
Figure 5:
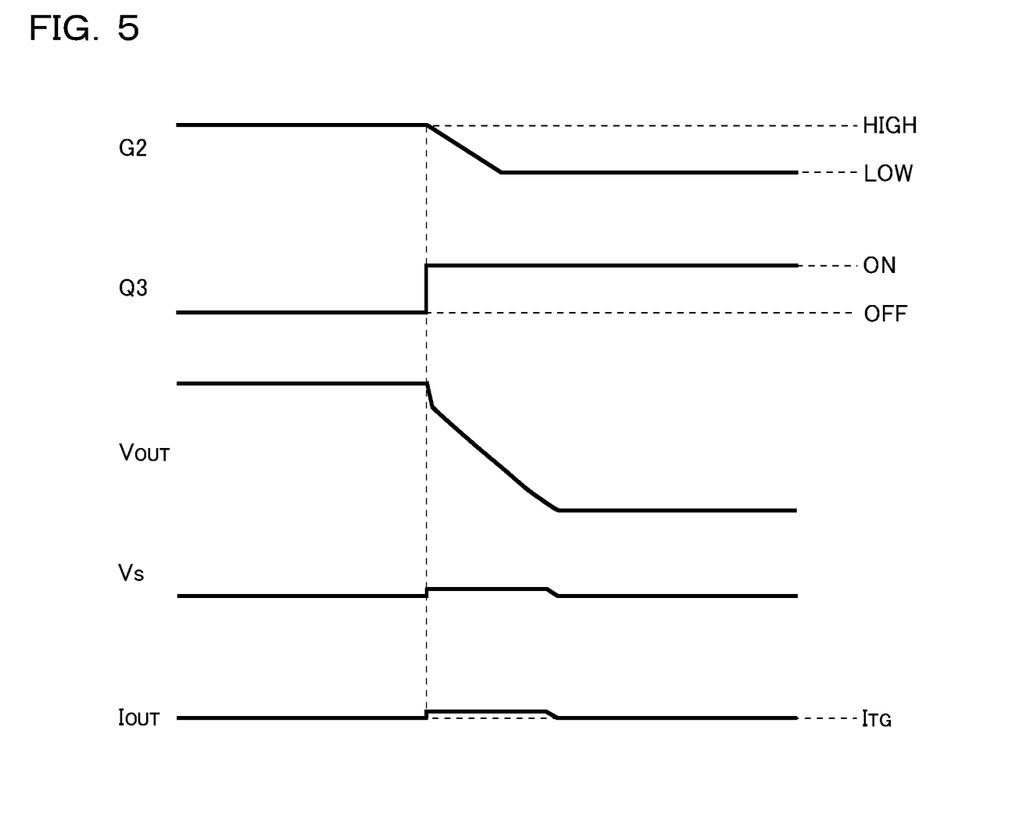
FIG. 5 is a timing chart showing a voltage across a sense resistor and an output current in the light-emitting device shown in FIG. 4.

FIG. 4 is a diagram showing a light-emitting device according to a second configuration example. The light-emitting device shown in FIG. 4 differs from the light-emitting device shown in FIG. 1 in that the PMOS transistor Q2 is provided in the short-circuiting path SP1, and is in other respects configured similarly to the light-emitting device shown in FIG. 1. FIG. 5 is a time chart showing the voltage Vs across the sense resistor Rs and the output current $I_{OUT}$ in the light-emitting device shown in FIG. 4.

In the light-emitting device shown in FIG. 1, when the PMOS transistor Q3 turns from OFF state to ON state according to the gate signal G3, the short-circuiting path SP1 immediately turns from cut-off state to conducting state.

Thus, if the error amplifier 11 is not a fast-response amplifier, the operation for suppressing an increase in the output current $I_{OUT}$ may delay, letting the output current $I_{OUT}$ become high during the delay.

By contrast, in the light-emitting device shown in FIG. 4, even when the PMOS transistor Q3 turns from OFF state to ON state according to the gate signal G3, the gate signal G2 of the PMOS transistor Q2 turns gently from HIGH level to LOW level (see FIG. 5), and the source-drain resistance of the PMOS transistor Q2 gently decreases; thus, the short-circuiting path SP1 gently turns from cut-off state to conducting state. Thus, even if the error amplifier 11 is not a fast-response amplifier, the operation for suppressing an increase in the output current $I_{OUT}$ does not delay. Accordingly, the light-emitting device shown in FIG. 4 can, even if the error amplifier 11 is not a fast-response amplifier, suppress an increase in the output current $I_{OUT}$ immediately after the PMOS transistor Q3 turns from OFF state to ON state.

Third Configuration Example

Figure 6:
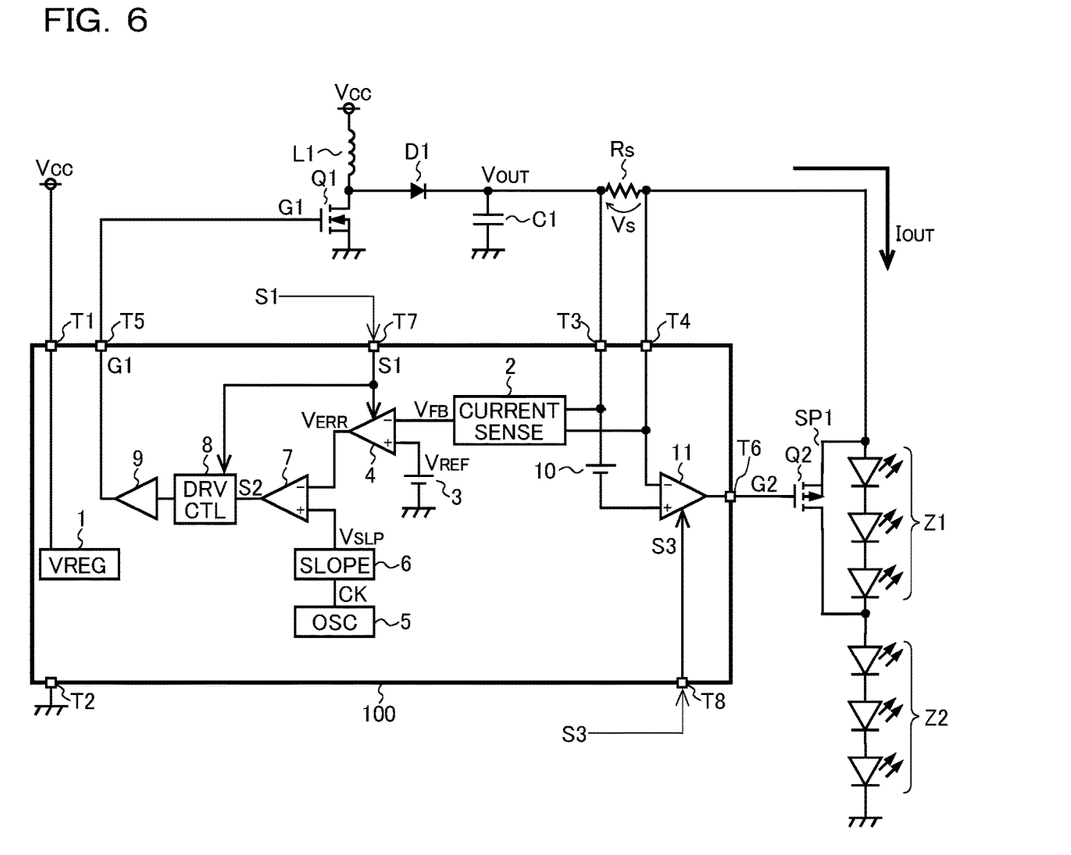
FIG. 6 is a diagram showing a light-emitting device according to a third configuration example.
Figure 7:
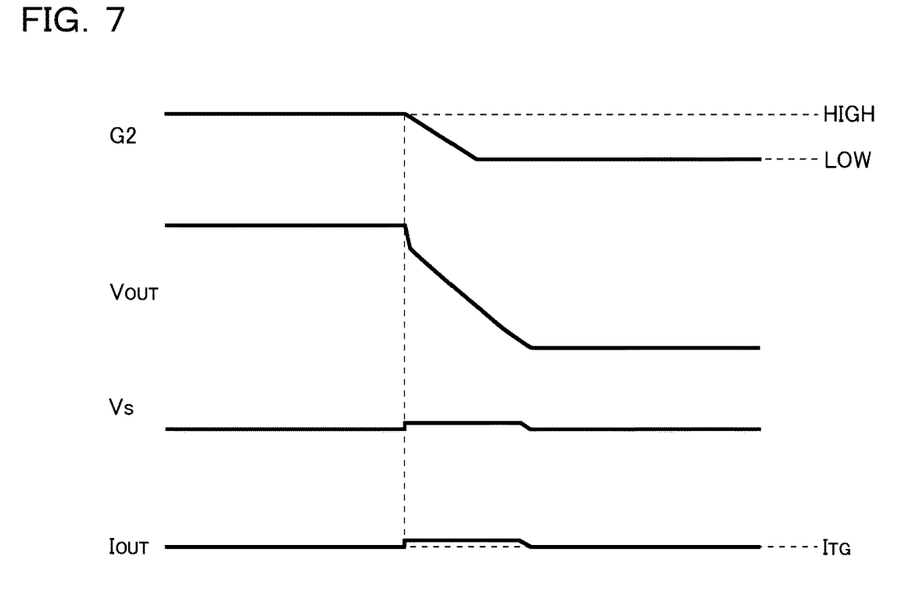
FIG. 7 is a timing chart showing a voltage across a sense resistor and an output current in the light-emitting device shown in FIG. 6.

FIG. 6 is a diagram showing a light-emitting device according to a third configuration example. The light-emitting device shown in FIG. 6 differs from the light-emitting device shown in FIG. 4 in that the PMOS transistor Q3 is omitted and in that the light-emitting element driver IC 100 further has an external terminal T8, and is in other respects configured similarly to the light-emitting device shown in FIG. 4. FIG. 7 is a time chart showing the voltage Vs across the sense resistor Rs and the output current $I_{OUT}$ in the light-emitting device shown in FIG. 6.

The external terminal T8 is a terminal via which to feed in, from outside the light-emitting element driver IC 100, a signal S3 that instructs not to short-circuit the light source Z1, that is, a signal S3 that instructs to keep the short-circuiting path SP1 in cut-off state.

Usable as the signal S3 that instructs not to short-circuit the light source Z1 is, for example, a signal fed from a microcomputer (not shown), a camera module (not shown), or the like. In another possible configuration, a switch is provided that switches between a state where the external terminal T8 is connected to a first voltage feeder which outputs a HIGH-level voltage and a state where the external terminal T8 is connected to a second voltage feeder which outputs a LOW-level voltage, and the switch is controlled according to a signal fed from a microcomputer (not shown), a camera module (not shown), or the like. Also with this configuration, whether to feed or not to feed the signal S3 that instructs not to short-circuit the light source Z1 to the external terminal T8 can be switched. In that case, either of a HIGH-level voltage signal and a LOW-level voltage signal that are fed to the external terminal T8 serves as the signal S3 that instructs not to short-circuit the light source Z1.

When the signal S3 that instructs not to short-circuit the light source Z1 is fed to the external terminal T8, the error amplifier 11 stops the operation for generating the error signal which is commensurate with the input voltage (Vs−$V_B$) to it applied between the non-inverting input terminal (+) and the inverting input terminal (−) of the error amplifier 11, and feeds a HIGH-level signal to the external terminal T6. As a result, the gate signal G2 for the PMOS transistor Q2 turns to HIGH level; thus, the PMOS transistor Q2 turns to OFF state, and the short-circuiting path SP1 turns to cut-off state.

Like the light-emitting device shown in FIG. 4, the light-emitting device shown in FIG. 6 can, even if the error amplifier 11 is not a fast-response amplifier, suppress an increase in the output current $I_{OUT}$ immediately after the PMOS transistor Q3 turns from OFF state to ON state. Moreover, as compared with the light-emitting device shown in FIG. 4, the light-emitting device shown in FIG. 6 can reduce the number of components externally connected to the light-emitting element driver IC 100.

APPLICATION

Figure 8:
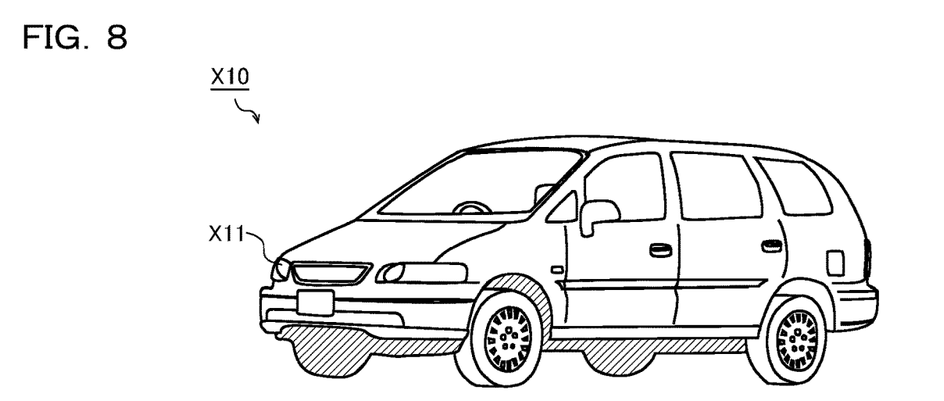
FIG. 8 is an exterior view of a vehicle incorporating a light-emitting device.

The light-emitting devices described above can be used suitably, for example, as headlamps X11 in a vehicle X10 as shown in FIG. 8.

Figure 9:
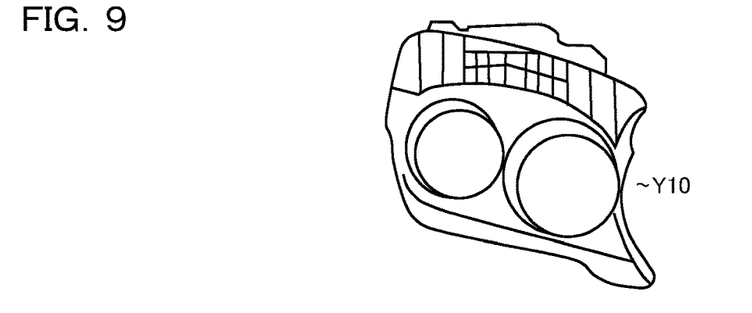
FIG. 9 is an exterior view of an LED headlamp module.

The light-emitting devices described above may be offered as an LED headlamp module Y10 as shown in FIG. 9, or may be offered as a semi-product in the form of a driving device, with the light-emitting diodes and the components other than the light-emitting element driver IC omitted.

Other Modifications

Although the above-described embodiments deal with configurations where light-emitting diodes are used as light-emitting elements, this is not meant to limit how the present invention should be implemented; instead, it is possible to use, for example, electro-luminescence elements as light-emitting elements.

Figure 10:
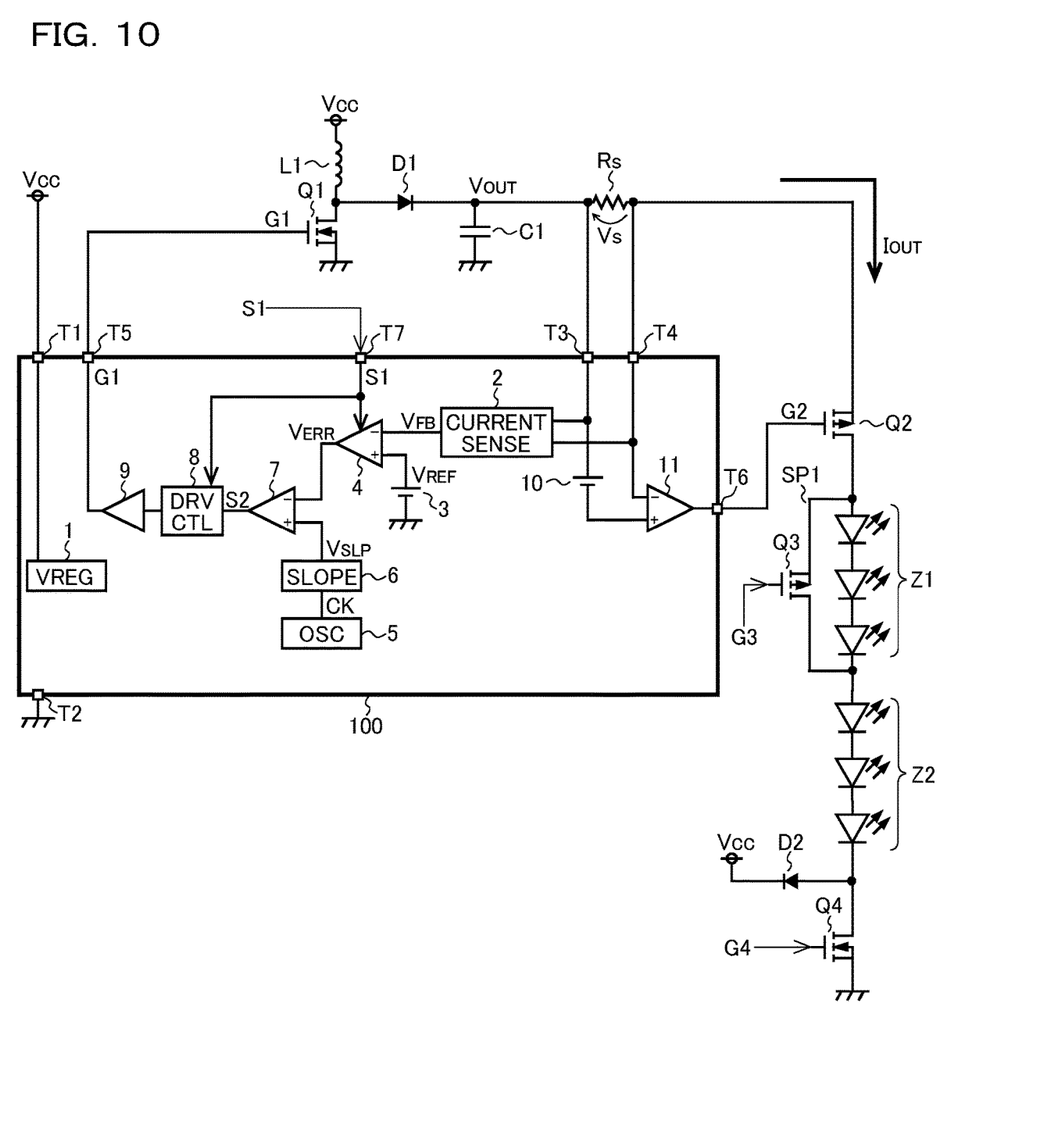
FIG. 10 is a diagram showing a modified example of a light-emitting device.
Figure 11:
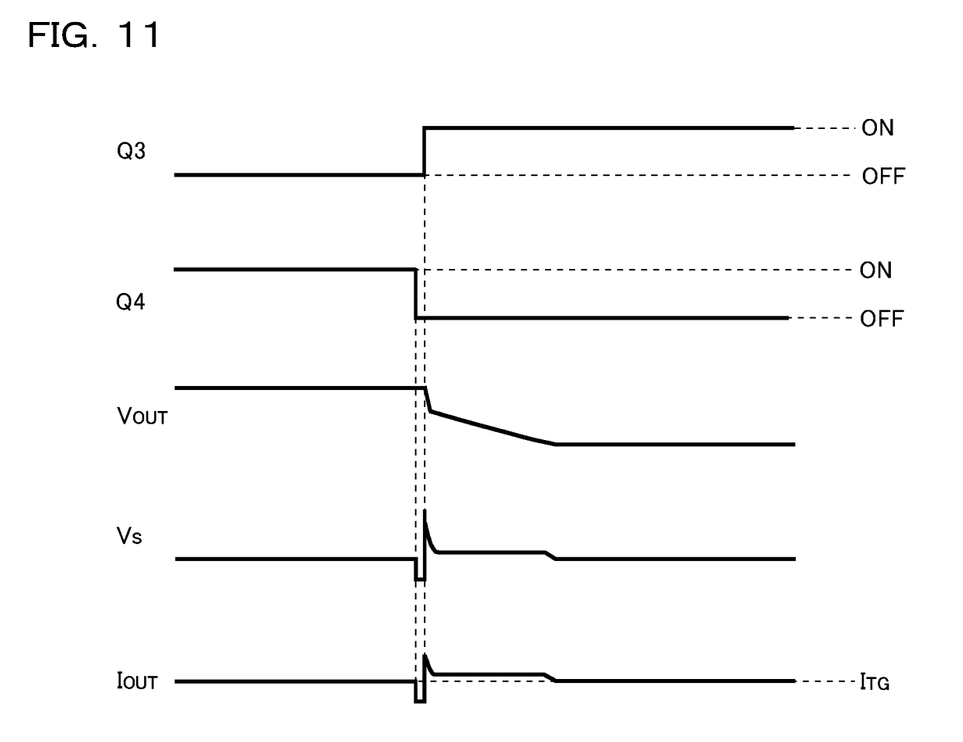
FIG. 11 is a timing chart showing a voltage across a sense resistor and an output current in the light-emitting device shown in FIG. 10.

The light-emitting device shown in FIG. 1 may be modified to have a configuration as shown in FIG. 10 that further includes an NMOS transistor Q4 and a reverse-current prevention diode D1. The drain of the NMOS transistor Q4 is connected to the cathode of the light source Z2 and to the anode of the diode D2. The source of the NMOS transistor Q4 is grounded. To the cathode of the diode D2, the supply voltage Vcc is fed. As shown in FIG. 11, immediately before the PMOS transistor Q3 turns from OFF state to ON state, the NMOS transistor Q4 turns from ON state to OFF state. This results in a higher cathode voltage in the light source Z2 when the short-circuiting path SP1 is in conducting state, and it is thus possible to suppress a decrease in the output voltage $V_{OUT}$ when the short-circuiting path SP1 is in conducting state.

The NMOS transistor Q4 is controlled between ON state or OFF state according to a gate signal G4. Usable as the gate signal G4 for the NMOS transistor Q4 is, for example, a signal fed from a microcomputer (not shown), a camera module (not shown), or the like. In another possible configuration, a switch is provided that switches between a state where the gate of the NMOS transistor Q4 is connected to a first voltage feeder which outputs a HIGH-level voltage and a state where the gate of the NMOS transistor Q4 is connected to a second voltage feeder which outputs a LOW-level voltage, and the switch is controlled according to a signal fed from a microcomputer (not shown), a camera module (not shown), or the like. Also with this configuration, a HIGH-level or LOW-level gate signal G4 can be fed to the gate of the NMOS transistor Q4.

Like the light-emitting device shown in FIG. 1, the light-emitting device shown in FIG. 4 or the light-emitting device shown in FIG. 6 may be modified to additionally include the NMOS transistor Q4 and the reverse-current prevention diode D2.

The various technical features disclosed herein may be implemented in any other manners than in the embodiments described above and allow for many modifications without departing from the spirit of their technical ingenuity. For example, although the above-described embodiments deal with configurations where the output stage of the switching power supply circuit is of a step-up type, this is not meant to limit the design of the output stage; it can be adapted easily to any of a step-down type, a step-up/down type, and a SEPIC type. The sense resistor Rs may be provided on the cathode side of the light source Z2. Thus, the above-described embodiments should be considered in every aspect illustrative and not restrictive, and it should be understood that the technical scope of the present invention is defined not by the description of embodiments given above but by the appended claims and encompasses any modifications made in a sense and scope equivalent to those of the claims.

SYNOPSIS

According to a first configuration disclosed herein, a light-emitting element driving semiconductor integrated circuit constituting at least part of a light-emitting element driving device that is configured to drive a first light source including at least one light-emitting element and a second light source including at least one light-emitting element and connected in series with the first light source when the first light source is not short-circuited and drive the second light source when the first light source is short-circuited and that includes an output capacitor includes a controller that is configured to control the resistance value of a variable resistor connected in series with the first and second light sources according to the voltage across a resistor connected in series with the first and second light source.

According to a second configuration disclosed herein, a light-emitting element driving semiconductor integrated circuit constituting at least part of a light-emitting element driving device that is configured to drive a first light source including at least one light-emitting element and a second light source including at least one light-emitting element and connected in series with the first light source when the first light source is not short-circuited and drive the second light source when the first light source is short-circuited and that includes an output capacitor includes a controller that is configured to control the resistance value of a variable resistor provided in a short-circuiting path by which the first light source is short-circuited according to the voltage across a resistor connected in series with the first and second light source.

In the light-emitting element driving semiconductor integrated circuit according to the second configuration described above, the controller may be configured to, on receiving a signal instructing not to short-circuit the first light source, stop operation for controlling the resistance value of the variable resistor according to the voltage across the resistor and control the resistance value of the variable resistor at such a value that the short-circuiting path is kept in cut-off state by the variable resistor (a third configuration).

In the light-emitting element driving semiconductor integrated circuit according to any one of the first to third configurations described above, the controller may include an error amplifier and a constant-voltage source, and the voltage across the resistor may be corrected by the constant-voltage source and be then fed to the error amplifier (a fourth configuration).

According to a fifth configuration disclosed herein, a light-emitting element driving device configured to drive a first light source including at least one light-emitting element and a second light source including at least one light-emitting element and connected in series with the first light source when the first light source is not short-circuited and drive the second light source when the first light source is short-circuited includes a power supply circuit configured to generate an output voltage from an input voltage and including an output capacitor, a short-circuiting path configured to short-circuit the first light source, a switch provided in the short-circuiting path and configured to switch between a state where the short-circuiting path is in conducting state and a state where the short-circuiting path is in cut-off state, a resistor connected in series with the first and second light sources, a variable resistor connected in series with the first and second light sources, and a controller configured to control the resistance value of the variable resistor according to the voltage across the resistor.

According to a sixth configuration disclosed herein, a light-emitting element driving device configured to drive a first light source including at least one light-emitting element and a second light source including at least one light-emitting element and connected in series with the first light source when the first light source is not short-circuited and drive the second light source when the first light source is short-circuited includes a power supply circuit configured to generate an output voltage from an input voltage and including an output capacitor, a short-circuiting path configured to short-circuit the first light source, a variable resistor provided in the short-circuiting path, a resistor connected in series with the first and second light sources, and a controller configured to control the resistance value of the variable resistor according to the voltage across the resistor.

According to what is disclosed herein, a light-emitting device includes a first light source including at least one light-emitting element, a second light source including at least one light-emitting element and connected in series with the first light source, and the light-emitting element driving device according to the firth or sixth configuration described above configured to drive the first and second light sources when the first light source is not short-circuited and drive the second light source when the first light source is short-circuited (an seventh configuration).

In the light-emitting device according to the seventh configuration described above, the light-emitting element may be a light-emitting diode or an organic EL element (an eighth configuration).

According to what is disclosed herein, a vehicle includes the light-emitting device according to the seventh or eighth configuration described above, and the light-emitting device may be used as a headlamp (a ninth configuration).

What is claimed is:

1. A light-emitting element driving semiconductor integrated circuit constituting at least part of a light-emitting element driving device configured to:
    drive a first light source including at least one light-emitting element and a second light source including at least one light-emitting element and connected in series with the first light source when the first light source is not short-circuited, and
    drive the second light source when the first light source is short-circuited,
    the light-emitting element driving device comprising:
    a voltage converter, and
    an output capacitor smoothing a voltage output from the voltage converter, the light-emitting element driving semiconductor integrated circuit comprising:
    a controller that includes an error amplifier and a constant-voltage source, the controller configured to control a resistance value of a variable resistor according to a voltage across a first resistor connected in series with the first and second light sources, wherein:

the controller is operable to adjust an anode voltage of a series-connection array composed of the first and second light sources, the variable resistor is connected between the first resistor and an anode of the series-connection array, the variable resistor being a MOS transistor, wherein an output terminal of the error amplifier is connected to a gate of the MOS transistor, the first resistor being connected between the variable resistor and a connection node between the voltage converter and the output capacitor, the light-emitting element driving semiconductor integrated circuit being operable such that:

when the MOS transistor is in an ON state, a resistance value of the variable resistor varies over both saturation and non-saturation characteristic regions of the MOS transistor according to the voltage across the first resistor when a current is passing through the variable resistor, the voltage across the first resistor is corrected by the constant-voltage source and is then fed to the error amplifier, and the error amplifier generates an error signal by amplifying a voltage applied between a non-inverting input terminal of the error amplifier and an inverting input terminal of the error amplifier and outputs the error signal via the output terminal of the error amplifier.

2. The light-emitting element driving semiconductor integrated circuit of claim 1, wherein the variable resistor has
a first terminal connected to the first resistor and
a second terminal connected to the anode of the series-connection array.

3. The light-emitting element driving semiconductor integrated circuit of claim 1, wherein the variable resistor is connected to the anode of the series-connection array with no other elements between the variable resistor and the anode of the series-connection array.

4. A light-emitting element driving semiconductor integrated circuit constituting at least part of a light-emitting element driving device configured to:

drive a first light source including at least one light-emitting element and a second light source including at least one light-emitting element and connected in series with the first light source when the first light source is not short-circuited, and drive the second light source when the first light source is short-circuited, the light-emitting element driving device comprising:
an output capacitor, and
a short-circuiting path connected in parallel with the first light source, the short-circuiting path having:
  a first terminal connected to an anode of the first light source, and
  a second terminal connected to a cathode of the first light source, the light-emitting element driving semiconductor integrated circuit comprising:
a controller that includes an error amplifier and a constant-voltage source, the controller configured to control a resistance value of a variable resistor according to a voltage across a first resistor connected in series with the first and second light sources,
wherein the variable resistor is provided in the short-circuiting path, the variable resistor being a MOS transistor, wherein an output terminal of the error amplifier is connected to a gate of the MOS transistor, the light-emitting element driving semiconductor integrated circuit being operable such that:

when the MOS transistor is in an ON state, a resistance value of the variable resistor varies over both saturation and non-saturation characteristic regions of the MOS transistor according to the voltage across the first resistor when a current is passing through the variable resistor, the voltage across the first resistor is corrected by the constant-voltage source and is then fed to the error amplifier, and the error amplifier generates an error signal by amplifying a voltage applied between a non-inverting input terminal of the error amplifier and an inverting input terminal of the error amplifier and outputs the error signal via the output terminal of the error amplifier.

5. The light-emitting element driving semiconductor integrated circuit of claim 4, wherein the variable resistor is connected to the anode of the first light source.

6. The light-emitting element driving semiconductor integrated circuit of claim 4, wherein a switch connected in series with the variable resistor is provided in the short-circuiting path.

7. The light-emitting element driving semiconductor integrated circuit of claim 6, wherein the switch is operable to switch the short-circuiting path between a conducting state and a cut-off state.

8. The light-emitting element driving semiconductor integrated circuit of claim 4, further comprising:
a diode having
  a cathode receiving a supply voltage and
  an anode connected to a cathode of the second light source; and
a switching element having
  a third terminal connected to the cathode of the second light source and
  a fourth terminal receiving a voltage lower than the supply voltage,
wherein the switching element is turned from on to off before switching from a state where the first light source is short-circuited to a state where the first light source is not short-circuited.

9. A light-emitting element driving semiconductor integrated circuit constituting at least part of a light-emitting element driving device configured to:

drive a first light source including at least one light-emitting element and a second light source including at least one light-emitting element and connected in series with the first light source when the first light source is not short-circuited, and drive the second light source when the first light source is short-circuited, the light-emitting element driving device comprising an output capacitor, the light-emitting element driving semiconductor integrated circuit comprising:
a first terminal; and
a controller that includes an error amplifier and a constant-voltage source, the controller configured to control a resistance value of a variable resistor according to a signal fed to the first terminal and a voltage across a first resistor connected in series with the first and second light source, wherein the variable resistor has:
a second terminal connected to an anode of the first light source, and
a third terminal connected to a cathode of the first light source, the variable resistor being a MOS transistor, wherein an output terminal of the error amplifier is connected to a gate of the MOS transistor,
the light-emitting element driving semiconductor integrated circuit being operable such that:
when the MOS transistor is in an ON state, a resistance value of the variable resistor varies over both saturation and non-saturation characteristic regions of the MOS transistor according to the voltage across the first resistor when a current is passing through the variable resistor,
the voltage across the first resistor is corrected by the constant-voltage source and is then fed to the error amplifier, and
the error amplifier generates an error signal by amplifying a voltage applied between a non-inverting input terminal of the error amplifier and an inverting input terminal of the error amplifier and outputs the error signal via the output terminal of the error amplifier.

10. The light-emitting element driving semiconductor integrated circuit of claim 9 operable such that:
when a signal that instructs not to short-circuit the first light source is fed to the first terminal, the controller controls the resistance value of the variable resistor according to the voltage across the first resistor, and
when a signal that instructs to short-circuit the first light source is fed to the first terminal, the controller controls the resistance value of the variable resistor to such a value that the short-circuiting path is cut-off by the variable resistor.

11. A light-emitting device, comprising:
a first light source including at least one light-emitting element;
a second light source including at least one light-emitting element and connected in series with the first light source; and
the light-emitting element driving semiconductor integrated circuit of claim 1.

12. A light-emitting device, comprising:
a first light source including at least one light-emitting element;
a second light source including at least one light-emitting element and connected in series with the first light source; and
the light-emitting element driving semiconductor integrated circuit of claim 4.

13. A light-emitting device, comprising:
a first light source including at least one light-emitting element;
a second light source including at least one light-emitting element and connected in series with the first light source; and
the light-emitting element driving semiconductor integrated circuit of claim 9.

14. A vehicle, comprising:
the light-emitting device of claim 11, wherein the light-emitting device is operable as a headlamp.

15. A vehicle, comprising:
the light-emitting device of claim 12, wherein the light-emitting device is operable as a headlamp.

16. A vehicle, comprising:
the light-emitting device of claim 13, wherein the light-emitting device is operable as a headlamp.

* * * * *